(12) United States Patent
Bernard et al.

(10) Patent No.: US 12,505,538 B2
(45) Date of Patent: Dec. 23, 2025

(54) SYSTEM AND METHOD FOR PROJECTION ENHANCEMENT FOR SYNTHETIC 2D IMAGE GENERATION

(71) Applicant: GE Precision Healthcare LLC, Wauwatosa, WI (US)

(72) Inventors: Sylvain Bernard, Montigny le Bretonneux (FR); Dejun Wang, Beijing (CN); Buer Qi, Beijing (CN); Gopal B. Avinash, Concord, CA (US); Gireesha Rao, Pewaukee, WI (US); Vincent Bismuth, Paris (FR)

(73) Assignee: GE Precision Healthcare LLC, Wauwatosa, WI (US)

( * ) Notice: Subject to any disclaimer, the term of this patent is extended or adjusted under 35 U.S.C. 154(b) by 446 days.

(21) Appl. No.: 18/077,575

(22) Filed: Dec. 8, 2022

(65) Prior Publication Data

US 2024/0193763 A1    Jun. 13, 2024

(51) Int. Cl.
  *G06T 7/00* (2017.01)
  *G06T 5/00* (2024.01)
  *G06T 7/194* (2017.01)

(52) U.S. Cl.
  CPC .............. *G06T 7/0012* (2013.01); *G06T 5/00* (2013.01); *G06T 7/194* (2017.01); *G06T 2207/10116* (2013.01); *G06T 2207/30096* (2013.01)

(58) Field of Classification Search
  CPC ......... G06T 7/0012; G06T 5/00; G06T 7/194; G06T 2207/10116; G06T 2207/30096;
  (Continued)

(56) References Cited

U.S. PATENT DOCUMENTS 9,792,703 B2    10/2017  Costa et al.
10,255,697 B2    4/2019  Homann et al.
(Continued)

FOREIGN PATENT DOCUMENTS

| DE | 102009009383 A1 | * | 8/2010 | ........... G06T 11/006 |
| EP | 3856033 A1 | | 8/2021 | |
| WO | WO-2016099924 A1 | * | 6/2016 | ............. A61B 6/022 |

OTHER PUBLICATIONS

EP application 23210269.9 filed Nov. 16, 2023—Search Report issued Apr. 19, 2024; 7 pages.
(Continued)

*Primary Examiner* — Ross Varndell
*Assistant Examiner* — Justin Philip Cascais
(74) *Attorney, Agent, or Firm* — Boyle Fredrickson S.C.

(57) ABSTRACT

Various methods and systems are provided for enhancing the generation of a synthetic 2D image from tomosynthesis projection images, such as a synthetic 2D image. To enhance the image, the image processing system utilizes a selected height interval to scan for objects of interest within a volume reconstructed from the tomosynthesis projection images. The height interval is larger than normal slices formed from the reconstructed volume, such that pixel information on larger masses can be obtained from adjacent slices within the volume. Further, the illustration of the object of interest in the synthetic 2D image can be modified by contributing pixel information from all tomosynthesis projections for the presentation of the object or interest. The use of pixel information from all tomosynthesis projections enhances the illustration of the high frequency components and the low frequency components of the object of interest within the enhanced image.

19 Claims, 13 Drawing Sheets

(58) Field of Classification Search
CPC ..... A61B 6/5223; A61B 6/025; A61B 6/4441;
A61B 6/5205
See application file for complete search history.

(56) References Cited

U.S. PATENT DOCUMENTS

| | | | |
|---|---|---|---|
| 10,290,101 B1 | 5/2019 | Podilchuk et al. | |
| 10,573,276 B2 | 2/2020 | Kreeger et al. | |
| 2009/0274354 A1* | 11/2009 | Ng | A61B 6/4028 |
| | | | 382/131 |
| 2018/0130201 A1* | 5/2018 | Bernard | A61B 6/502 |
| 2019/0051023 A1* | 2/2019 | Bernard | G06T 11/008 |
| 2020/0107794 A1* | 4/2020 | Mandelkern | G06T 7/136 |
| 2021/0177371 A1* | 6/2021 | Wang | A61B 90/39 |
| 2021/0304460 A1* | 9/2021 | Han | A61B 6/502 |
| 2022/0015731 A1* | 1/2022 | Liu | A61B 6/502 |
| 2022/0301192 A1* | 9/2022 | Boardman | G06T 7/579 |

OTHER PUBLICATIONS

Jun Zhang et al., "Breast mass detection in mammography and tomosynthesis via fully convolutional network-based heatmap regression", Proc. SPIE 10575, Medical Imaging 2018: Computer-Aided Diagnosis, 1057525 (Feb. 27, 2018).

\* cited by examiner

Original projection image
(Central projection)

Extracted interest of slice(e.g. @118mm) by AI findings automatically

Slice image @118mm

Re-projection image from slice

Re-projection image from slice with enhancement @118mm

SYSTEM AND METHOD FOR PROJECTION ENHANCEMENT FOR SYNTHETIC 2D IMAGE GENERATION

FIELD OF THE DISCLOSURE

The present disclosure relates to the field of tomosynthesis and to a method and system for processing tomosynthesis imaging data for obtaining enhanced projection images.

BACKGROUND OF THE DISCLOSURE

X-ray imaging systems have become a valuable tool in medical applications such as for the diagnosis of many diseases. As standard screening for a variety of medical issues, 2-dimensional (2D) x-ray images are taken across the entire tissue of interest. These known 2D images are limited by tissue superimposition. That is to say, lesions may be masked by the tissue above or underneath, or normal structures may mimic a lesion. In order to minimize limitations of standard 2D-mammography caused by tissue superimposition, tomosynthesis using digital receptors has been developed.

These tomosynthesis systems employ at least one x-ray tube, which is moved in a line or in an arc above a stationary or slightly tiltable detector. In a tomosynthesis imaging process, the volume information of an object of interest can be derived from a series of images, known as projection images or projections, which are taken at various angles by means of one or more x-ray sources. Objects of different heights in imaged tissue display differently in the different projections. From the 2D projection images 3D volumes can be generated for review. The generated 3D volume portions offer advantages to overcome the limitations associated with tissue superimposition in prior art imaging systems and processes.

However, even with the improved imaging capabilities of tomosynthesis technology, the use of 2D images is still desired by medical professionals and/or radiologists, who want to use their existing expertise gained from reviewing 2D images. Furthermore, archived 2D-images can be better compared with images obtained with the same technology than with 3D tomosynthesis images.

One problem to be addressed is that images acquired during tomosynthesis sweep through digital receptors may be contaminated by a variety of noise sources. By noise we refer to stochastic variations as opposed to deterministic distortions such as lack of focus. One drawback is that a single tomosynthesis projection image at a given orientation or x-ray source position is very noisy because the dose per projection is not enough to be compared to a prior art 2D acquisition. Accordingly, there is a need to improve image quality comprising noise management in order to offer a tomosynthesis projection 2D image that looks like a known full-dose 2D image in order to enable a high quality diagnostic review.

As such, in order to provide the desired 2D image, synthetic 2D images can be produced by the imaging system and provided to the radiologist. The synthetic 2D image provides a summary representation of the information present across each of the projection images obtained in the tomosynthesis imaging process so that the radiologist can review the information present in the 3D volume by looking at the single synthetic 2D image. To generate the synthetic 2D image, one of the projections, such as the central projection or the projection obtained at an angle almost perpendicular to the tissue being imaged, is selected as the basis for the synthetic 2D image. As the low dose projection is very noisy and may not contain all relevant diagnostic information, i.e., information that is contained in projections other than in the selected projection, it is necessary to enhance the selected projection to form the synthetic 2D image. Various manners of performing this enhancement are available, including those disclosed in U.S. Pat. No. 9,842,415, entitled Method For Processing Tomosynthesis Acquisitions In Order To Obtain A Representation Of The Contents Of An Organ and U.S. Pat. No. 10,092,262, entitled Method And System For Tomosynthesis Projection Images Enhancement, each of which are expressly incorporated herein by reference in their entirety for all purposes.

While the prior art methods for producing an enhanced 2D projection, i.e., synthetic 2D image, from the selected projection generate a 2D image that provides more and clearer information on the imaged tissue than any individual projection, the synthetic 2D image produced in these processes suffers from certain drawbacks with regard to the generation of the synthetic 2D image in the high and low frequency ranges for the synthetic 2D image.

More specifically, concerning the high frequency range, the synthetic 2D image is often produced using a maximum contrast process to produce the synthetic 2D image using a maximum intensity projection (MIP) of filtered projections. As shown in FIG. 1, the imaging system filters all of the projections 3000, such as through the use of a high pass filter 3002 within the image processing unit of the imaging system. The filtered projections are then back projected 3004 to form a high frequency volume 3006 that is analyzed 3008 by the image processing unit to determine the highest intensity or value voxels within the high frequency volume through the use of a computer aided detection (CAD) system for detecting lesions and other anomalies in the volume or by selecting the object/voxel of highest contrast along the line of an x-ray path from the source to the detector through the volume. This highest value voxel often represents a lesion or other structure that should be reviewed by the radiologist. The selected voxels are then reduced to single image in order to form the MIP 3010 that provides details or sharpness of the anomalies, e.g., calcifications, fibers, mass spicules, etc., within the volume represented/summarized by the MIP. The selected projection, i.e., the low pass filtered central projection 3012, provides background for the synthetic 2D image, and is combined with the MIP to form the synthetic 2D image 3014. Each pixel of the selected projection is potentially modified in a manner that illustrates the presence of the structures to be reviewed within the single synthetic 2D image.

However, as only the maximum contrast between aligned pixels across each of the different slices is utilized to form the synthetic 2D image, certain structures, such as mass spicules, that have a fainter contrast, these structures can be not represented in the MIP and the synthetic 2D image generated using the MIP.

Concerning the low frequency components of the synthetic 2D image, the low frequency component of the synthetic 2D image is fully provided by the central projection, i.e., the contribution of the central projection to the low-frequency component of the synthetic 2D image is set at 1, with the contribution set at 0 for each of the other projections. The details of high frequency components are then added onto the background obtained from the reconstruction of filtered projections, followed by the MIP. This approach properly renders the details of small objects like calcifications or vessels because the synthetic 2D image representations of these objects are mainly composed of high frequencies. However, in case of larger objects like masses that are not readily rendered in the MIP relying only on the central projection for the low-frequency generation of the synthetic 2D image is not sufficient.

Therefore, in order to provide a more accurate and sharp representation of the reconstructed volume content in the synthetic 2D image, it is desirable to develop a system and method that is improved in depicting spiculated masses and similar structures in the synthetic 2D image by addressing the low and high frequency limitations present in current synthetic 2D image generation systems and processes.

SUMMARY OF THE DISCLOSURE

According to one exemplary embodiment of the disclosure, a method of forming an enhanced 2D image from a number of 2D tomosynthesis projections includes the steps of acquiring the tomosynthesis projections, detecting positions of lesions or objects of interest from the projections or the volume formed from the tomosynthesis data, and synthesizing a 2D image wherein the contribution of each projection to the synthetic 2D image varies spatially depending on the positions of the lesions or the objects of interest. In certain embodiments, the contribution to the synthetic 2D image of a central tomosynthesis projection used as the basis for the synthetic 2D image is a maximum in areas where no lesion is detected along the ray path from the source to the pixel to be synthesized. In still other embodiments, the contributions of each projection to the synthetic 2D image are equal in areas where at least one lesion or object of interest is detected along the ray path from the source to the pixel to be synthesized. In still further embodiments, the contribution of the central projection with respect to the other projections depends on the distance from the pixel to be synthesized to the lesion or object of interest reprojection.

According to another exemplary embodiment of the disclosure, a method of forming an enhanced 2D image from a number of 2D tomosynthesis projections includes acquiring tomosynthesis projections using an imaging system, detecting positions of lesions or other objects of interest from a volume formed from the tomosynthesis projections, filtering a set of slices from the tomosynthesis projections within a desired height interval, and synthesizing a 2D image wherein the contribution of each slice to the synthetic 2D image varies spatially depending on the lesion positions within the slices. Further, when the tomosynthesis images are taken of a breast, the set of slices contributing to the synthetic 2D image is selected to correspond to the full breast thickness in areas where no lesion or object of interest is detected along the ray path from the source to the pixel to be synthesized. Alternatively, the set of slices contributing to the synthetic 2D image is selected to correspond to a volume portion around the lesion/object of interest height in areas where at least one lesion or object of interest is detected along the ray path from the source to the pixel to be synthesized. Further, the volume portion selected for the representation of the lesion or object of interest can be a fixed thickness, or can be determined or selected depending on the size and/or type of the lesion or object of interest.

According to another aspect of an exemplary embodiment of the disclosure, an x-ray tomosynthesis imaging system includes a gantry including an x-ray detector and an x-ray source alignable and moveable with regard to the x-ray detector to obtain 2D tomosynthesis projection images of a subject placed on or adjacent the x-ray detector, an image system operably connected to the gantry to control the x-ray source and x-ray detector to generate 2D tomosynthesis projection image data, the image system including a processing unit for processing the 2D tomosynthesis projection image data from the detector to reconstruct a volume, an electronic storage memory operably connected to the processing unit and storing instructions for operation of the imaging system to produce at least one enhanced image of an object of interest located within the subject, a display operably connected to the image system for presenting information to a user, and a user interface operably connected to the image system to enable user input to the image system wherein the image system is configured to select a height interval within the volume for conducting a computer aided detection (CAD) analysis for the object of interest, to perform the CAD analysis along the height interval within the volume, to locate pixels representing the object of interest within the height interval, and to enhance a 2D tomosynthesis projection image with the pixels representing the object of interest to form the enhanced image of the object of interest.

According to another aspect of an exemplary embodiment of the present disclosure, a method for obtaining at least one enhanced image of an object of interest using a system comprising an x-ray source facing a detector including the steps of moving the x-ray source to a plurality of positions relative to the detector, the detector being stationary, and acquiring a 2D tomosynthesis projection image of the object of interest at each of the plurality of positions, reconstructing a volume of the object from the 2D tomosynthesis projection images, performing the CAD analysis within the volume, locating pixels representing the object of interest within the volume and enhancing a 2D tomosynthesis projection image with the pixels representing the object of interest, wherein the step of enhancing the 2D tomosynthesis projection image comprises the step of modifying contributions from the 2D tomosynthesis projections for the pixels representing the object of interest.

According to still another aspect of an exemplary embodiment of the present disclosure, a method for obtaining at least one enhanced image of an object of interest using a system comprising an x-ray source facing a detector including the steps of moving the x-ray source to a plurality of positions relative to the detector, the detector being stationary, and acquiring a 2D tomosynthesis projection image of the object of interest at each of the plurality of positions, reconstructing a volume of the object from the 2D tomosynthesis projection images, selecting a height interval within the volume provided by a computer aided detection (CAD) analysis for an object of interest locating pixels representing the object of interest within the height interval and enhancing a 2D tomosynthesis projection image with the pixels representing the object of interest to form the enhanced image of the object of interest.

These and other exemplary aspects, features and advantages of the invention will be made apparent from the following detailed description taken together with the drawing figures.

BRIEF DESCRIPTION OF THE DRAWINGS

The drawings illustrate the best mode currently contemplated of practicing the present invention.

In the drawings.

DETAILED DESCRIPTION OF THE DRAWINGS

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

The following description relates to various embodiments of systems and methods for synthesizing 2D x-ray images using tomosynthesis, to provide a synthesized 2D image using a selected and/or the central projection image in combination with a volume reconstructed with the projection images acquired during the continuous sweep or multiple images comprising the imaging sequence. The methods utilize a map identifying the areas in which lesions are located to establish parameters for the generation of an improved and enhanced synthesized 2D radiographic image.

Although the present application is presented and described in part within the context of tomography, it is to be understood that other radiographic applications and imaging of other organs and organ systems may be performed using the systems and methods as disclosed herein.

Figure 1:
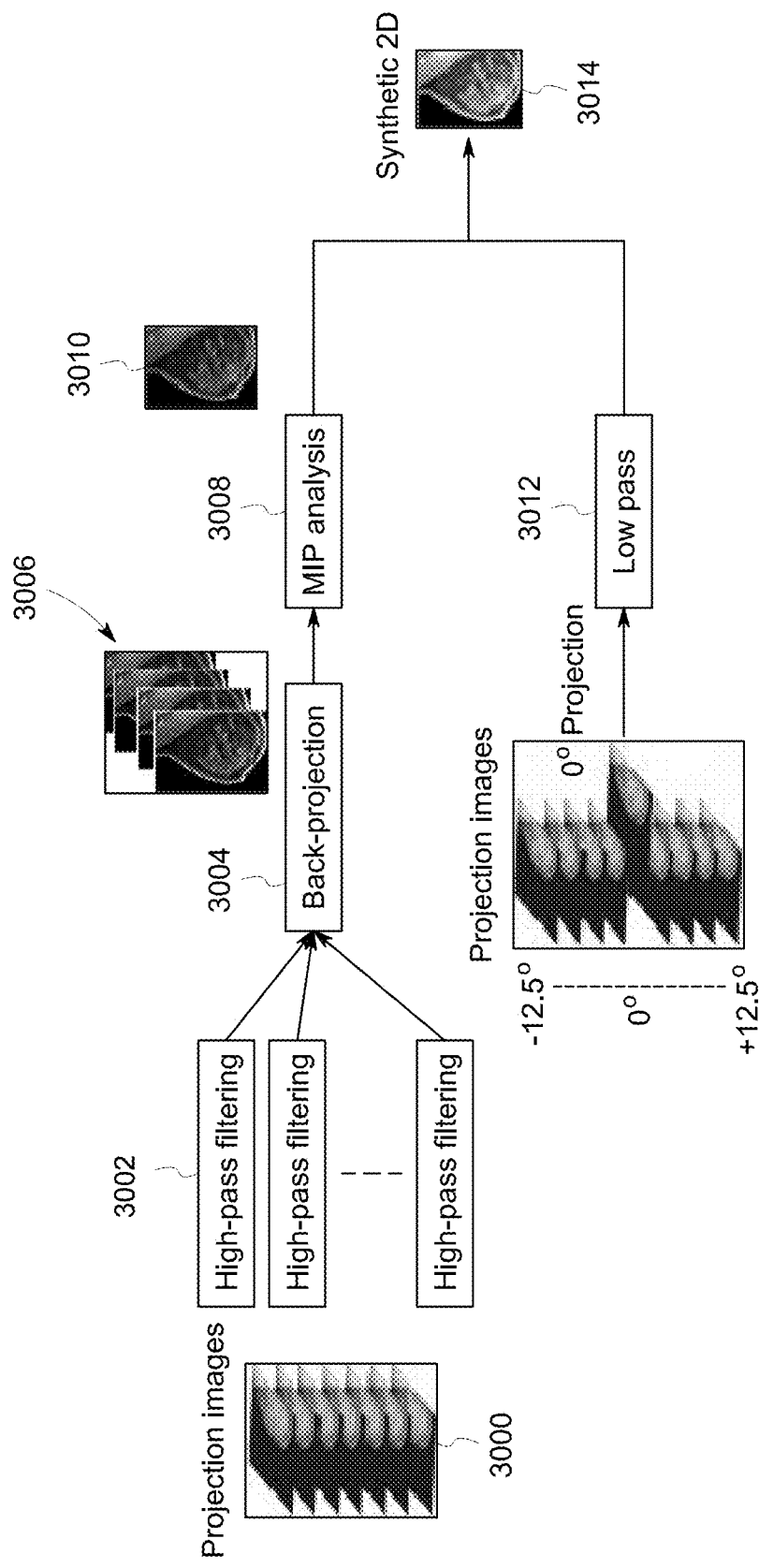
FIG. 1 is a schematic illustration of a prior art synthetic 2D image generation system and process.
Figure 2:
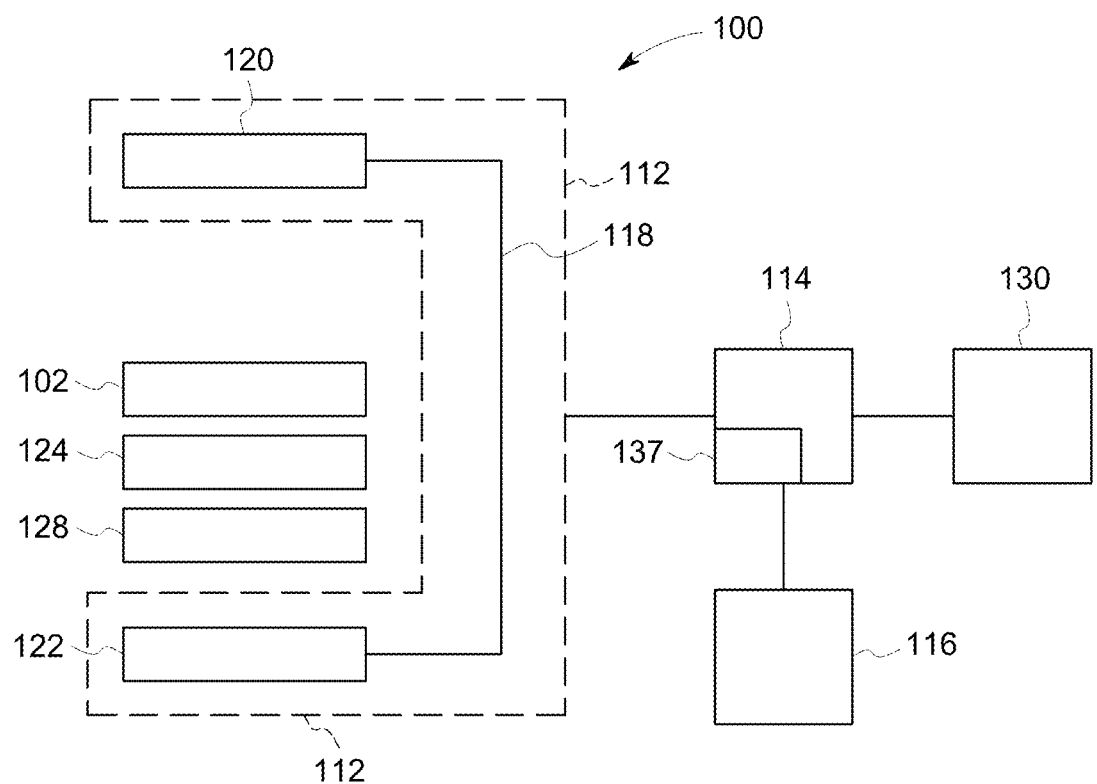
FIG. 2 is a block schematic diagram of an exemplary tomosynthesis imaging system according to an exemplary embodiment of the disclosure.

Illustrated in FIG. 2 is a schematic diagram of an exemplary embodiment of a medical imaging system 100 for acquisition of tomosynthesis images and tomosynthesis dataset generation. The exemplary system 100 includes an image acquisition unit 112, an image processing unit 114, optionally a memory storage unit 130, a graphical display 116, and/or (not shown) a connection to a network for external storage and display (e.g. a picture archiving and communication system or PACS). The image acquisition unit 112 includes a c-arm 118. The c-arm 118 includes, at opposing ends, an x-ray emitter 120 and an x-ray detector 122.

The system 100 includes a lower support 124. The organ to be imaged is placed on the lower support 124. The lower support 124 holds and/or supports the organ in a relative axial alignment with the c-arm 118 between the x-ray emitter 120 and the x-ray detector 122. In certain exemplary embodiments, the detector 122 can be positioned within and/or formed as a part of the lower support 124, such that the c-arm 118 only includes the emitter 120 for movement around the organ. In still other embodiments where the emitter 120 and detector 122 are fixed, multiple emitters 120 can be employed where the emitters 120 are each positioned at desired angles relative to the detector 122 and/or support 124.

In acquiring radiographic images of the anatomy, object or organ, the x-ray emitter 120 is operated to produce x-rays which are projected in the direction of the organ (or target object) 102. The x-rays pass through the organ 102 to the detector 122. In an exemplary embodiment, the imaging system 100 may also be provided with an anti-scatter grid 128. The anti-scatter grid 128 may include a plurality of opaque components arranged parallel to one another, in a direction parallel to the motion of the c-arm 118. Such anti-scatter grids are typically used to limit the impact of the spread of emitted x-rays within the patient's body.

The c-arm 118 may be coaxially aligned with the organ 102, for example in the position disposed on the lower support 124, with the c-arm 118 operable to rotate about the organ 102 disposed in this position. During rotation of the c-arm 118, the scatter grid 128 and detector 122 may rotate with the c-arm 118 or not. In some embodiments, the image detector 122 remains fixed during movement. That is, in some embodiments, the organ 102 and detector 122 remain in a fixed alignment with one another while the emitter 120 moves in relation to the organ 102 (and detector 122) during the tomosynthesis sweep/sequence. In some embodiments, the whole assembly (image acquisition unit) 112 is able to rotate simultaneously to change the projection relative to patient anatomy (e.g. vertical, lateral, etc.).

Figure 3:
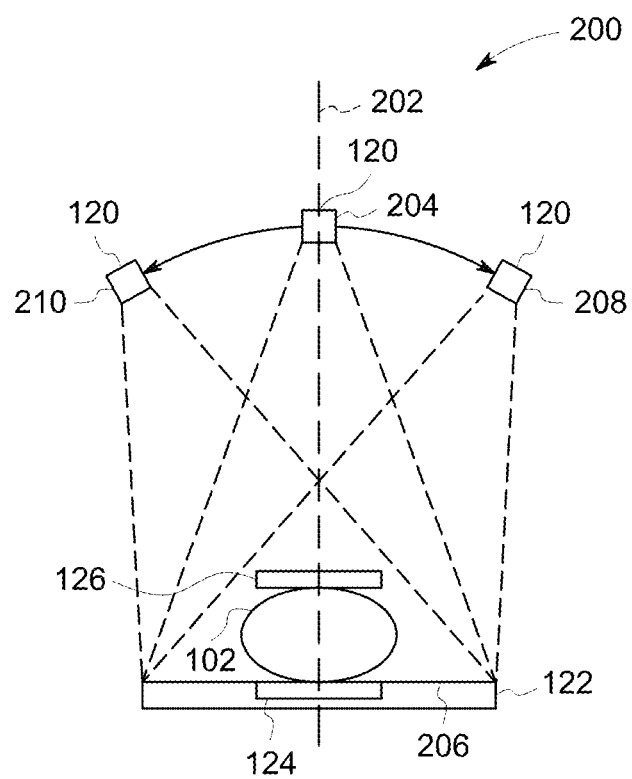
FIG. 3 is a block schematic diagram of an exemplary mammography imaging system according to an exemplary embodiment of the disclosure.
Figure 4:
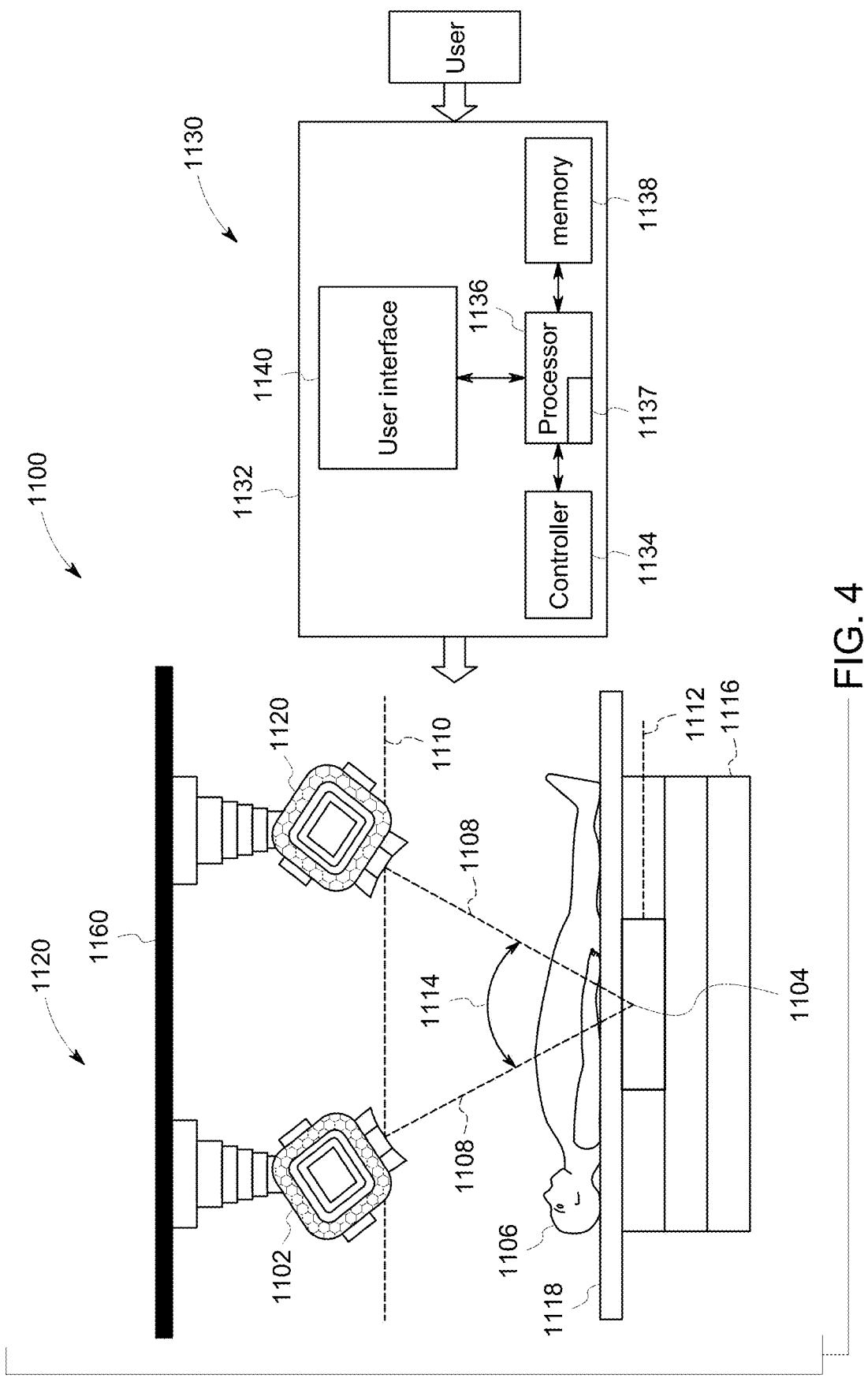
FIG. 4 is a schematic diagram of an exemplary tomographic system according to an exemplary embodiment of the disclosure.

Although the system 100 depicted in FIG. 2 shows the x-ray detector 122 being rotatable in conjunction with emitter 120, such that the emitter 120 and the detector 122 are maintained in alignment, it will be recognized that in additional embodiments of medical imaging systems, the detector 122 may be held in a fixed position relative to the organ 102, for example, by locating the x-ray detector 122 in the lower support 124 (as shown in FIGS. 3 and 4).

Also shown in FIG. 2, the image processing unit/image system 114 may be connected to or incorporate a memory unit 130 which may comprise a non-transitory computer readable medium. The memory unit 130 may be located inside or outside the processor/image system 114. The processor 114 may operate to read and/or write information from/to the memory unit 130. The memory unit 130 may comprise a hard disk or SSD or any other rewritable and/or removal storage medium, such as, for example USB flash drives, memory cards, etc. The memory unit 130 may be a ROM/RAM memory of the processor 114, flash memory, and/or memory on a remotely located server. The memory may further be programmed with computer readable instructions/code embodying one or more programs, routines, algorithms, or subroutines which is accessible by the processor 114 and executable by the processor 114 to carry out the acquisition unit control, image processing, and display functions and operations and methods as disclosed herein. In some embodiments, the image processing unit 114 may comprise, as previously mentioned, a connection to a network for external storage and display (e.g. a picture archiving and communication system or PACS), with the image processing unit 114 adapted to permit storing, retrieving, presenting, and/or sharing images produced by the system 100.

FIG. 3 illustrates an exemplary relative positioning 200 of the x-ray emitter 120 during a DBT image acquisition. In particular, FIG. 2 depicts exemplary movement of the x-ray emitter 120 relative to the organ (breast) 102 for performing a DBT sequence for acquiring DBT radiographic images. To support and engage the breast, the system 100 includes a compression support 126 that can be lowered relative to the support 124 to compress the organ 102, i.e., breast, between the lower support 124 and the compression plate 126. Generally speaking, compression of the breast 102, such as between supports 126 and 124, has been important, especially for 2D only mammography, for improved imaging quality. Compression generally helps to spread out the normal fibro glandular (or more dense) tissue of the breast making it easier for the medical practitioner/radiologist to differentiate the breast tissue and detect abnormalities that might otherwise be hidden by the overlying (or superimposed) tissue. If the breast is not well compressed, overlapping tissue may appear and be interpreted as a mass or abnormality. DBT, as mentioned, provides improvements to the issue of superimposition. Consequently, in the context of DBT, compression of the organ is mainly used for reducing the breast thickness, therefore reducing the irradiation needed for imaging, and for immobilizing the organ during the DBT acquisition sequence.

As shown, the emitter 120 may be alignable to a zero (0°) or center (or "central") position 204 along an axis 202 that is perpendicular (orthogonal) or substantially perpendicular, to within a predetermined tolerance around 0°, e.g. a predetermined tolerance of)+/−0.5° to the detector 122. The axis 202 may be, as shown, substantially orthogonal to one or both of the organ (target object) 102 and the detector 122. In one embodiment, the orthogonal or center position 204 represents the position, within a predetermined tolerance, at which a central projection is acquired, which is employed to provide the background image for a synthetic 2D image created using information obtained from the DBT sequence of exposures (or DBT sweep).

Figure 5:
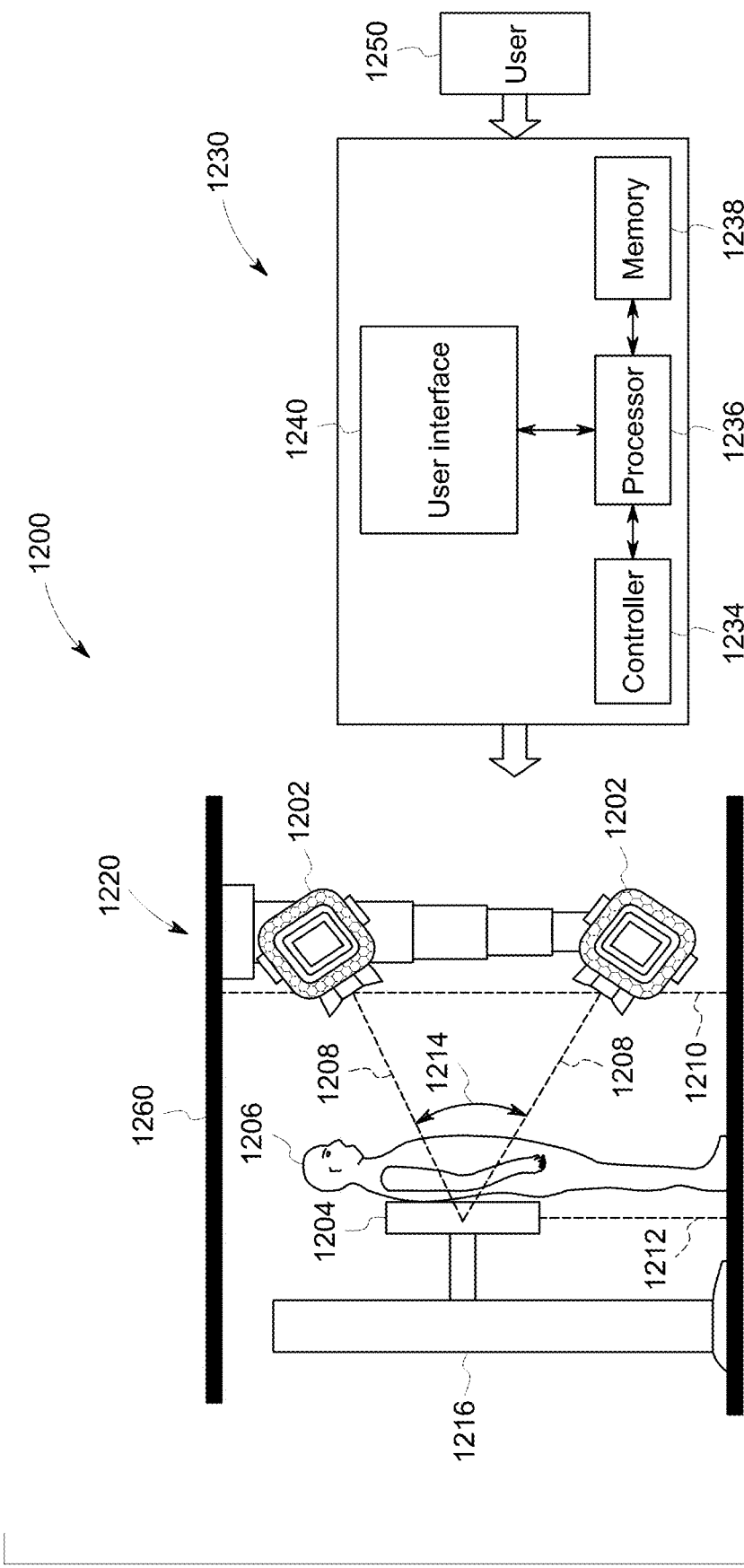
FIG. 5 is a schematic diagram of an exemplary tomographic system according to an exemplary embodiment of the disclosure.

Referring now to the drawings, FIGS. 4 and 5 illustrate other exemplary embodiments of a digital X-ray radiographic tomosynthesis system 1100,1200. FIG. 4 illustrates a table acquisition configuration having an X-ray source 1102 attached to a structure 1160 and an X-ray detector 1104 positioned within a table 1116 (functioning similar to lower support 124 of FIGS. 2 and 3) under a table top 1118, while FIG. 5 illustrates a wallstand configuration having an X-ray source 1202 attached to a structure 1260 and an X-ray detector 1204 attached to a wallstand 1216. The digital X-ray radiographic tomosynthesis radiography system 1100, 1200 includes an X-ray source 1102, 1202, which subject a patient under examination 1106, 1206 to radiation in the form of an X-ray beam 1108, 1208. The X-ray beam 1108, 1208 is emitted by the X-ray source 1102, 1202 and impinges on the patient 1106, 1206 under examination. A portion of radiation from the X-ray beam 1108, 1208 passes through or around the patient and impacts the detector 1104, 1204.

In an exemplary embodiment, the X-ray source 100, 1102, 1202 may be an X-ray tube, and the patient under examination 102, 1106, 1206 may be a human patient, an animal patient, a test phantom, and/or other inanimate object under examination. The patient under examination 1106, 1206 is placed between the X-ray source 1102, 1202 and the detector 1104, 1204. During tomosynthesis acquisition, the X-ray source 1102, 1202 travels along the plane 1110, 1210 illustrated in FIGS. 4 and 5, and rotates in synchrony such that the X-ray beam 1108, 1208 is always pointed at the detector 1104, 1204 during the acquisition. As mentioned above, the X-ray source 1102, 1202 is typically moved along the single plane 1110, 1210 parallel to the plane 1112, 1212 of the detector 1104, 1204, although it may be moved outside of a single plane, which is substantially parallel to the detector 1104, 1204. The detector 1104, 1204 is maintained at a stationary position as radiographs are acquired. A plurality of discrete projection radiographs of the patient 1106, 1206 are acquired by the detector 1104, 1204 at discrete locations along the path 1110, 1112 of the X-ray source 1102, 1202. After acquiring projection image data from the projection radiographs, application software may be to reconstruct slice images.

The digital X-ray radiographic tomosynthesis imaging process includes a series of low dose exposures during a single sweep of the X-ray source 1102, 1202 moving within a limited angular range 1114, 1214 (sweep angle) by arc rotation and/or linear translation of the X-ray source 1102, 1202 and focused toward the stationary detector 1104, 1204. The X-ray source 1102, 1202 delivers multiple exposures during the single sweep from multiple projection angles. The sweep angle 1114, 1214 is the angle from the first projection exposure to the final projection exposure. The sweep angle 1114, 1214 is typically within a range from 20 to 60 degrees.

In an exemplary embodiment, the detector 1104, 1204 may comprise a plurality of detector elements, generally corresponding to pixels, which sense the intensity of X-rays that pass through and around patients and produce electrical signals that represent the intensity of the incident X-ray beam at each detector element. These electrical signals are acquired and processed to reconstruct a 3D volumetric image of the patient's anatomy. Depending upon the X-ray attenuation and absorption of intervening structures, the intensity of the X-rays impacting each detector element will vary.

FIGS. 4 and 5 further schematically illustrate a computer workstation 1130, 1230 coupled to a digital tomosynthesis imaging system 1120, 1220 of the digital X-ray radiographic tomosynthesis system 1100, 1200 providing a user interface 1140, 1240 for selecting at least one reconstruction, dose, and/or acquisition parameter for the digital X-ray radiographic tomosynthesis acquisition as described herein.

The digital tomosynthesis imaging system 1120, 1220 may be used for acquiring and processing projection image data and reconstructing a volumetric image or three-dimensional (3D) image representative of an imaged patient. The digital tomosynthesis imaging system 1120, 1220 is designed to acquire projection image data and to process the image data for viewing and analysis.

The computer workstation 1130, 1230 includes at least one image system/computer 1132, 1232 with a controller 1134, 1234, a processor 1136, 1236, memory 1138, 1238, and a user interface 1140, 1240. The processor 1136, 1236 may be coupled to the controller 1134, 1234, the memory 1138, 1238, and the user interface 1140, 1240. A user interacts with the computer workstation 1130, 1230 for controlling operation of the digital X-ray radiographic tomosynthesis system 1100, 1200. In an exemplary embodiment, the memory 1138, 1238 may be in the form of memory devices, memory boards, data storage devices, or any other storage devices known in the art.

The digital tomosynthesis imaging system 1120, 1220 is controlled by the controller 1134, 1234, which may furnish both power and control signals for digital tomosynthesis examination sequences, including positioning of the X-ray source relative to the patient and the detector. The controller 1134, 1234 may command acquisition of signals generated in the detector. The controller 1134, 1234 may also execute various signal processing and filtering functions, such as for initial adjustment of dynamic ranges, interleaving of digital image data, and so forth. In general, the controller 1134, 1234 commands operation of the digital tomosynthesis imaging system 1120, 1220 to execute examination protocols and to process acquired data. In an exemplary embodiment, the controller 1134, 1234 receives instructions from the computer 1132, 1232. In an exemplary embodiment, the controller 1134, 1234 may be part of the digital tomosynthesis imaging system 1120, 1220, instead of the computer workstation 1130, 1230.

In an exemplary embodiment, the computer 1132, 1232 includes or is coupled to the user interface 1140, 1240 for interaction by the user for selecting and/or changing clinically relevant parameters, such as dose, slice placement (reconstruction settings), and acquisition parameters. In an exemplary embodiment, operation of the digital X-ray radiographic tomosynthesis system 1100, 1200 is implemented through the use of software programs or algorithms downloaded on or integrated within the computer 1132, 1232.

In an exemplary embodiment, the user interface 1140, 1240 is a visual interface that may be configured to include a plurality of pre-defined tools, which will allow a user to view, select and edit reconstruction parameters (settings); view and select dose parameters; and view, select and edit tomosynthesis acquisition parameters. The plurality of pre-defined tools may include a tomosynthesis preference edit tool, a "Scout" acquisition edit tool, a tomosynthesis acquisition edit tool, and a plurality of slice image processing edit tools. The user interface 1140, 1240 also allows the user to view the reconstructed images.

In an exemplary embodiment, the user interface 1140, 1240 may include at least one input device for inputting and/or selecting information on the plurality of pre-defined tools displayed on the display of the user interface 1140, 1240. In an exemplary embodiment, the at least one input device may be in the form of a touch screen display, a mouse, a keyboard, at least one push button, or any other input device known in the art.

The processor 1136, 1236 receives the projection data from the detector 1104, 1204 and performs one or more image analyses, including that of a computer aided detection (CAD) system, among others, through one or more image processing operations. The processing unit/processor 1136, 1236 exemplarily operates to create a 3D volume using the projection data/projections and analyzes slices of the 3D volume to determine the location of lesions and other masses present within the 3D volume, as well as to store the 3D volume within a mass storage device 1138, 1238, where the mass storage device 1138,1238 may include, as non-limiting examples, a hard disk drive, a floppy disk drive, a compact disk-read/write (CD-R/W) drive, a Digital Versatile Disc (DVD) drive, a flash drive, and/or a solid-state storage device. As used herein, the term computer is not limited to just those integrated circuits referred to in the art as a computer, but broadly refers to a processor, a microcontroller, a microcomputer, a programmable logic controller, an application specific integrated circuit, and any other programmable circuit, and these terms are used interchangeably herein. It will be recognized that any one or more of the processors and/or controllers as described herein may be performed by, or in conjunction with the processing unit/processor 1136, 1236, for example through the execution of computer readable code stored upon a computer readable medium accessible and executable by the processing unit/processor 1136, 1236. For example, the computer/processing unit/processor 1136, 1236 may include a processor configured to execute machine readable instructions stored in the mass storage device 1138, 1238, which can be non-transitory memory. Processor unit/processor/computer 1136, 1236 may be single core or multi-core, and the programs executed thereon may be configured for parallel or distributed processing. In some embodiments, the processing unit 1136, 1236 may optionally include individual components that are distributed throughout two or more devices, which may be remotely located and/or configured for coordinated processing. In some embodiments, one or more aspects of the processing unit 1136,1236 may be virtualized and executed by remotely-accessible networked computing devices configured in a cloud computing configuration. According to other embodiments, the processing unit/computer 1136, 1236 may include other electronic components capable of carrying out processing functions, such as a digital signal processor, a field-programmable gate array (FPGA), or a graphic board. According to other embodiments, the processing unit/computer 36 may include multiple electronic components capable of carrying out processing functions. For example, the processing unit/computer 1136, 1236 may include two or more electronic components selected from a list of electronic components including: a central processor, a digital signal processor, a field-programmable gate array, and a graphic board. In still further embodiments the processing unit/computer 1136, 1236 may be configured as a graphical processing unit (GPU) including parallel computing architecture and parallel processing capabilities.

Figure 6:
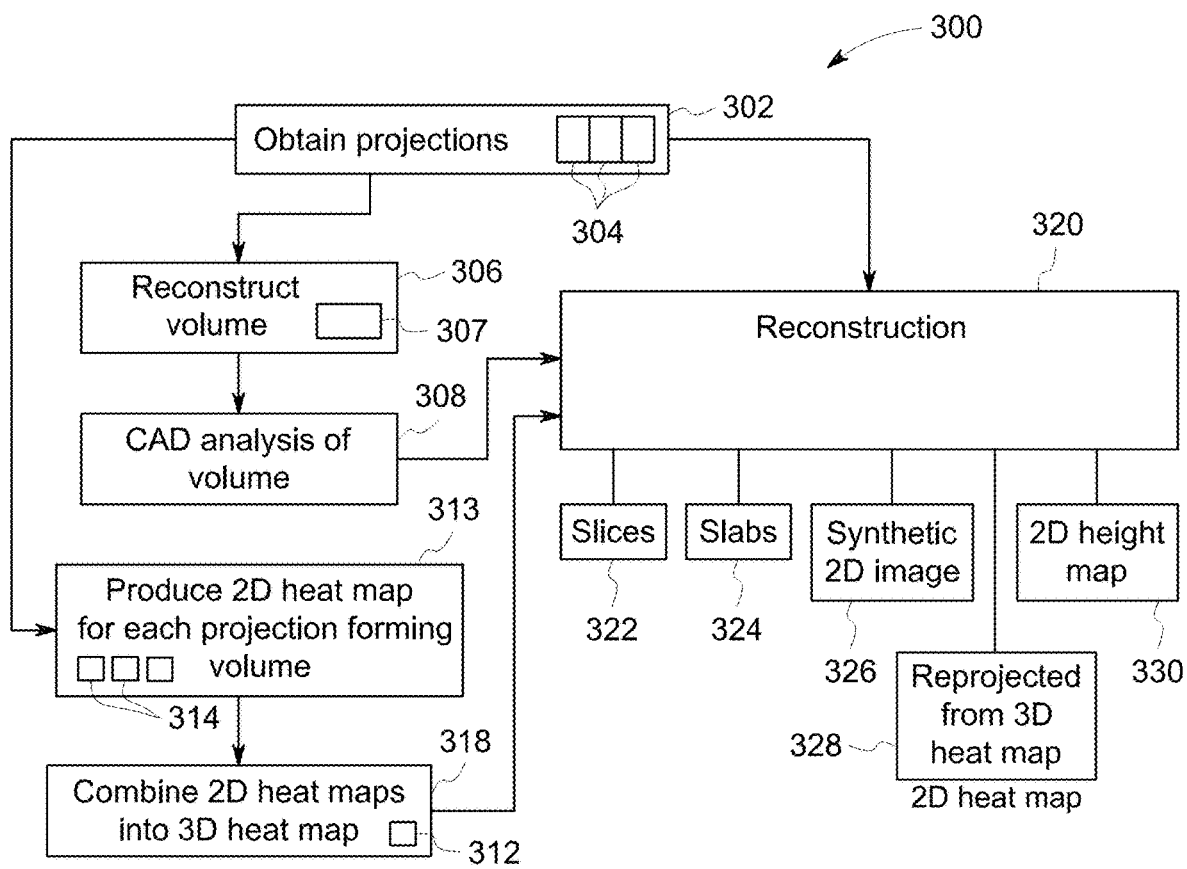
FIG. 6 is a block schematic diagram of the operation of a image processing and synthetic 2D image generation system and method according to an exemplary embodiment of the disclosure.
Figure 7:
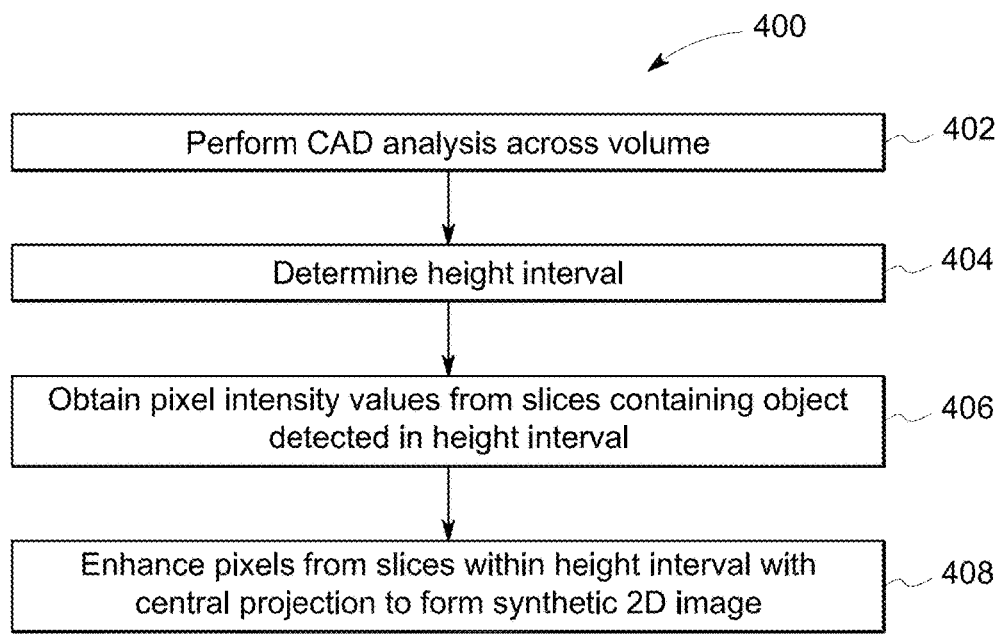
FIG. 7 is a flowchart of the method of the synthetic 2D image generation of according to an exemplary embodiment of the disclosure.

Looking now at FIGS. 6 and 7, schematic illustrations are presented of exemplary embodiments of the method 300 of generating an improved synthetic 2D image 326 that addresses issues in the prior art regarding the inadvertent filtering or omission of certain high frequency signals representing masses in projection images used to form the synthetic 2D image.

In one embodiment of the method 300, in an initial step 302 the projections 304 are obtained by the imaging system 100,1100,1200. Subsequently, in step 306 the projections 304 are processed by the image processor/processing unit 114,1136,1236 in order to reconstruct a volume 307 of the subject of the projections 304, which can be segmented by the processing unit 114,1136,1236 to form slices or slabs of a desired thickness or height.

In conjunction with the reconstruction of the volume 307, the processing unit/processor 114,1136,1236 operates to in step 308 to determine the presence and location of any objects of interest within the volume 307, e.g., performs a CAD analysis of the volume 307. In making this determination, the processing unit/processor 136, 1136,1236 analyzes the intensity of the voxels in the reconstructed 3D volume 307, which can be automatically determined, such as by the processing unit/processor 114,1136,1236, and/or can be selected by the radiologist depending upon the types of anomalies to be sought by the imaging procedure. In one exemplary embodiment of the method 300, the voxel intensity analysis can be conducted by an artificial intelligence (AI) component 137,1137,1237 of the processing unit/processor 114, 1136,1236 that operates according to a set of instructions for the AI 137,1137,1237 stored in non-transitory memory 130, 1138,1238 to perform the analysis of the volume. The AI 137,1137,1237 can be any suitable type of machine learning, such as a deep learning network trained to perform the desired CAD analysis of the volume. The analysis by the processing unit/processor 114, 1136,1236 and/or the AI 137,1137,1237 provides a value that is representative of the intensity for each of the voxels within the volume 307. The results of the analysis in step 308 can then be provided for reconstruction in step 320.

In another exemplary embodiment of the method 300, after obtaining the projection 304 in step 302, in step 313 the processing unit/processor 114,1136,1236 and/or the AI 137, 1137,1237 operates to produce a 2D heat map 314 for each of the projections 304. Each 2D heat map 314 provides an indication or intensity value at each pixel (x,y) in the projection 304 corresponding to the determined voxel intensity that can illustrate where the objects of interest are located along with the potential significance of the particular object based on the weight of the associated intensity value. Each 2D heat map 314 may also indicate that no object is expected at the pixel (x,y) position through a low intensity value from the associated voxel.

After formation of the 2D heat maps 314 corresponding to each of the projections 304, the 2D heat maps 314 can then be combined by the processing unit/processor 114,1136, 1236 in step 318 into a 3D heat map 312 using a back-projection operator. In one particular implementation of the method 300, the 3D heat map 312 is generated by the processing unit/processor 114,1136,1236 and/or the AI 137, 1137,1237.

As shown in FIG. 6, the projections 304, the volume 307 and the 3D heat map 312 can each be employed by the processing unit/processor 114,1136,1236 in a reconstruction 320 to provide as an output one or more slices 322, one or more slabs 324, one or more synthetic 2D images 326, a 2D height map for the slice 322 or slab 324, and a 2D heat map 328 (as reprojected from the 3D heat map 312) and/or height map 330 for the selected slice 322 or slab 324.

The 2D heat map 328 output from the reconstruction can be generated by applying projection algorithms on the 3D heat map 312 to obtain the 2D heat map 328 corresponding to the desired orientation of the associated reconstructed image, e.g, the slice 322 or slab 324 or synthetic 2D image 326. The 2D heat map 328 indicates a likelihood of an object of interest for each (x,y) position within the synthetic 2D image 326.

In addition, the 2D height map 330 output from the reconstruction 320 in association with the slice 322, slab 324 and/or synthetic 2D image 326 contains for each pixel, i.e., (x,y) position, a unique z-axis value. This information can be used as a navigation map associated to the synthetic 2D image 326. For each (x,y), it can be provided in finding the depth (z) where the maximum disease likelihood is.

In particular, with respect to FIG. 7, in an exemplary embodiment for the method 400 of the reconstruction/generation of the synthetic 2D image 326 representative of the volume 307, in step 402 the processing unit/processor 114,1136,1236 and/or the AI 137,1137,1237 analyzes the volume 307, such as by performing a CAD analysis of the volume 307 to detect and determine the locations of the objects of interest within the volume 307.

Once the lesions or objects of interest are located, in step 404 the processing unit/processor 114,1136,1236 and/or the AI 137,1137,1237 then determines a height interval or thickness, such as over the entire anatomy thickness, or that is determined to encompass the entirety of any lesions or object of interest previously detected within the volume 307. The height interval can be automatically determined by the processing unit/processor 114,1136,1236 and/or the AI 137, 1137,1237 in view of the known type or types of objects of interest to be located in the CAD analysis, with a smaller height interval for smaller object and a larger height interval for larger objects. The height interval can also be fixed within the imaging system 100, 1100,1200 such as with regard to an average lesion or other object size, or can be manually set by a radiologist based on the parameters for the imaging procedure to be performed, or a combination thereof. In one embodiment of the determination for the height interval, the height interval is selected to be larger than the height or thickness of an individual slice 322, such that the height interval for the CAD analysis used in selecting the lesions, masses and other objects of interest to be illustrated in the synthetic 2D image 326 extends across multiple slices 322.

In performing the analysis, any lesions, masses or other objects of interest located within the plane defined by the height interval can be selected for representation in the synthetic 2D image 326. Further, when an object of interest is detected, based on the known height interval the processing unit/processor 114,1136,1236 and/or the AI 137,1137, 1237 also knows the particular slice(s) 322 in which the pixels representing the object are disposed. As a result, when forming the synthetic 2D image 326 in a subsequent step 406, the thickness of the plane defined by the height interval enables the pixels/pixel intensity values from each slices that include data representing the detected calcification(s), lesion(s), mass(es), etc., as shown in the one or more adjacent slices 322, to be enhanced and/or reprojected with the central projection 304 in order to form the synthetic 2D image 326. These additional pixels/pixel intensity values from the slices associated with object of interest can then each be represented within the synthetic 2D image 326 in step 408, such as when the synthetic 2D image 326 is formed by reprojecting onto a central projection or a scout image with the intensity values of the pixels illustrating the detected calcification(s), lesion(s), mass(es), etc., across the entire selected height interval represented by the slices 322.

Figure 8A:
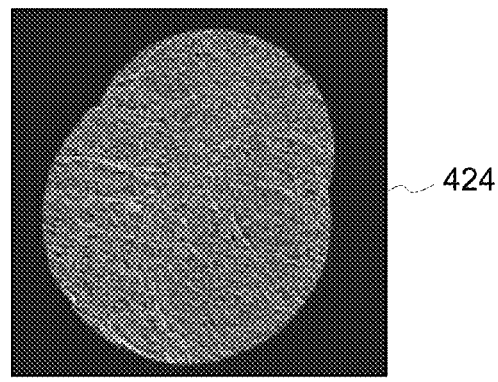
FIG. 8A-8C are representations of synthetic 2D images generated according to an exemplary embodiment of the disclosure.
Figure 8B:
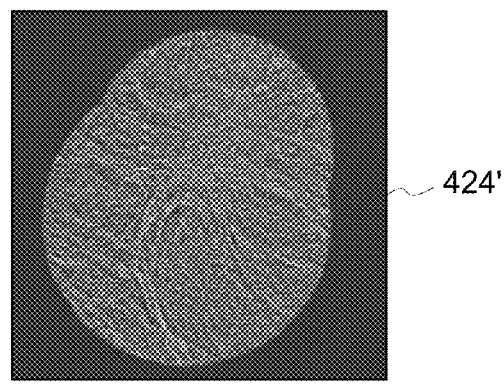
Figure 8C:
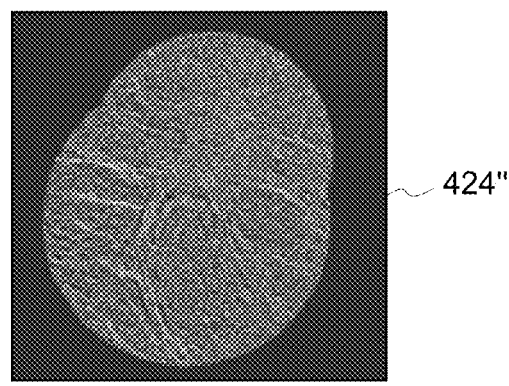

In particular, concerning the process employed in step 408, as illustrated in the exemplary synthetic 2D images 424, 424' and 424" shown in FIGS. 8A-8C, the image in FIG. 8A is a representation of an image 424 created as a MIP from a prior art maximum intensity process, as contrasted with the images 424' and 424" in FIGS. 8B and 8C being produced from a CAD analysis using increasing larger height intervals to obtain more detailed representations of the detected mass and spicules in the images 424', 424". In FIGS. 8B and 8C, rather than reprojecting slices across the entire anatomy as in 424 for high-frequency representation in the image, the images 424',424" are created using the slices from a height interval provided by the CAD system. The interval can be of fixed thickness as in 424' or of varying thickness as in 424". The reprojection step can be performed using a Maximum Intensity Projection operator or using a weighted average operator but not limited to. Also, the increased detail regarding the pixels in the slices 322 representing the object of interest enables the processing unit/processor 114,1136,1236 and/or the AI 137,1137,1237 to provide height, i.e., z-axis, information regarding the object(s) represented in the synthetic 2D image 326.

As an alternative exemplary embodiment to the method 400 of FIG. 7, the 3D heat map 312 can also be employed to provide information regarding the general locations of objects of interest within the volume 307 as a result of the voxel intensity values forming the 3D heat map 312. The selection of the height interval for the CAD analysis can be modified to be variable in order to accommodate the locations shown in the 3D heat map 312 and encompass the objects within the selected height intervals.

In FIGS. 9A-14, alternative and enhanced exemplary embodiments of the method of FIG. 7 are illustrated where the figures presented are schematic illustrations of exemplary embodiments of a system and method of generating an enhanced synthetic 2D image 326 that addresses issues in the prior art regarding the lack of low and high frequency signal contributions in a synthetic 2D image representing masses or other objects of interest detected in the reconstructed volume.

Figure 11:
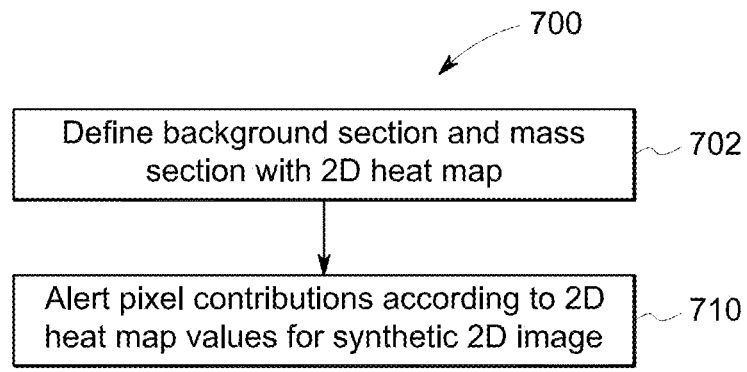
FIG. 11 is a flowchart of the method of synthetic 2D image enhancement according to an exemplary embodiment of the disclosure.

With regard now to FIG. 11, a schematic representation is shown of the method 700 for improving the representation of masses and other objects represented by low frequency signals in synthetic 2D images by improving the distribution of the signals within the produced synthetic 2D image 326. In an exemplary embodiment, the method 700 is employed after the reconstruction of a volume and slices from projection images obtained by the imaging system 100,1100,1200 and the formation of a 3D heat map according to the method 300 described previously, and/or after the determination the location of the object(s) to be represented within the synthetic 2D image as described previously regarding the discussion of the method 400 or as determined according to any other suitable CAD system or method. Alternatively, the method 700 can be employed with the method 400 alone, or with other combinations of the steps of the methods 300 and 400.

Figure 13A:
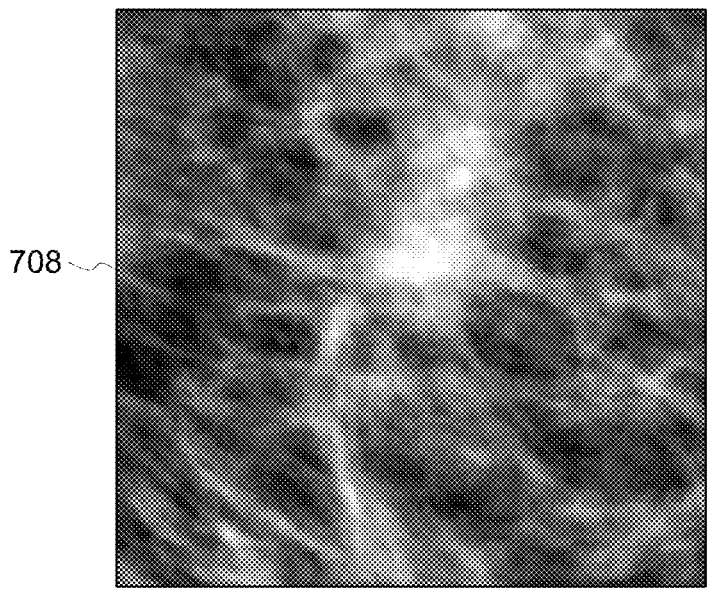
FIGS. 13A-13B are exemplary illustrations of tomographic projections utilized in the method of generation of the synthetic 2D image of FIG. 11.
Figure 13B:
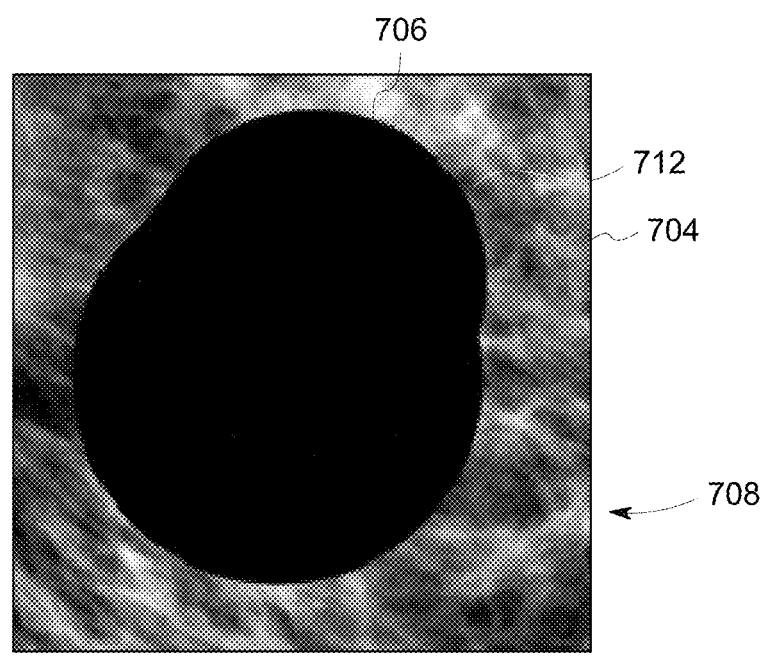
Figure 14A:
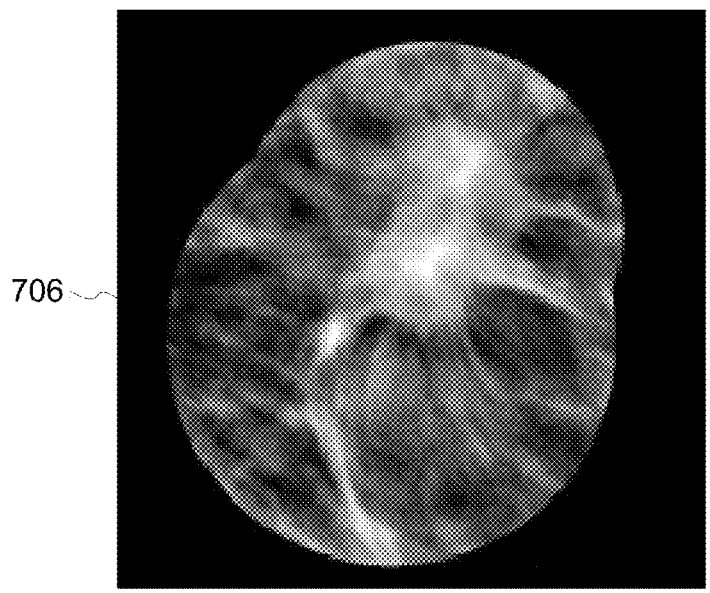
FIGS. 14A-14B are exemplary illustrations of tomographic projections utilized in the method of generation of the synthetic 2D image of FIG. 11.
Figure 14B:
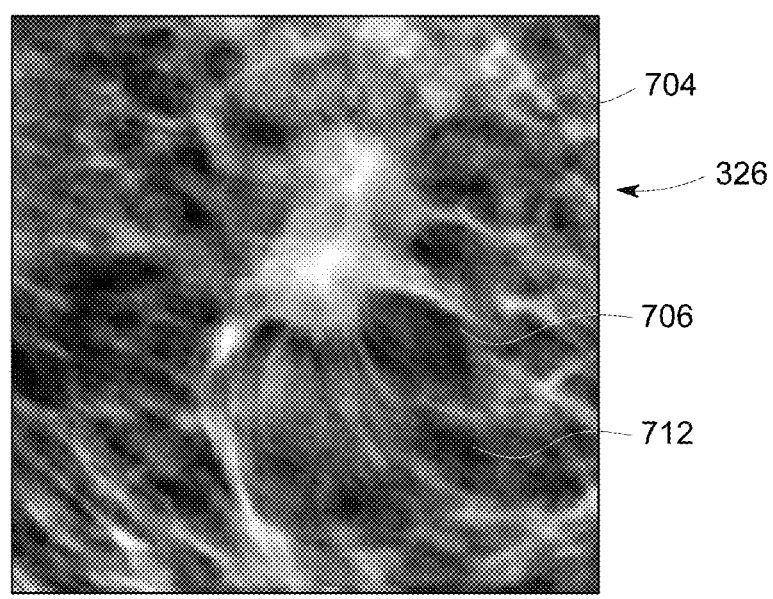

In a first step 702, the processing unit/processor 114,1136, 1236 and/or the AI 137,1137,1237 defines background or nonobject section 704 and one or more object of interest mass and/or object of interest section(s) 706 within the central projection or scout image 708, as shown in FIGS. 13A and 13B. The background or nonobject section(s) 704 are area(s) of the central projection 708 for which the 2D heatmap is below a predetermined threshold, e.g., where no lesion is detected along the ray path from the source to the pixel to be synthesized Using the method 400 of FIG. 7, for the background or nonobject section(s) 704 the height interval of the volume 307 selected for the reconstructed slices to be combined is the central projection. In these embodiments of the method 700, after employing the steps of the method 400 of FIG. 7, the representations of the pixels in the background or nonobject section 704 of the enhanced image/2D synthetic image 326 are provided by the results of step 408, such that the background or nonobject section 704 is formed similarly to the images shown in FIG. 8C.

The mass or object of interest section(s) 706 within the central projection 708, or other projection image selected for use as the basis for the enhanced image, is defined by the processing unit/processor 114,1136,1236 and/or the AI 137, 1137,1237 as the area within the central projection 708 that is aligned with 2D heatmap intensity pixel(s) that exceeds the threshold value, i.e., that represent an object of interest, and are contained within another projection to be combined with central projection 708 and presented as the synthetic 2D image 326, as previously detected and located by the processing unit/processor 136,1136,1236 and/or the AI 137, 1137,1237, such as according to the methods 300 and 400 described previously, or in any other suitable CAD detection process.

As shown in FIGS. 11, 13A-13B and 14A-14B, in step 702 the processing unit/processor 114,1136,1236 and/or the AI 137,1137,1237 delineates the background or nonobject section(s) 704 and the mass section(s) 706 in the central projection 708 through the use of a reprojection of the 3D heat map 312 to produce a 2D heat map 328 for the central projection 708. The 2D heat map 328 provides a range of combined intensity values for the pixels associated with all of the projections that are aligned with each pixel of the mass section 706 within the central projection 708.

In step 710, based on the values for each pixel within the 2D heat map 328, the processing unit/processor 114,1136, 1236 and/or the AI 137,1137,1237 alters or modifies the contributions of the pixels from each of the projections in order to form the representation of each pixel in the central projection 708.

Figure 12:
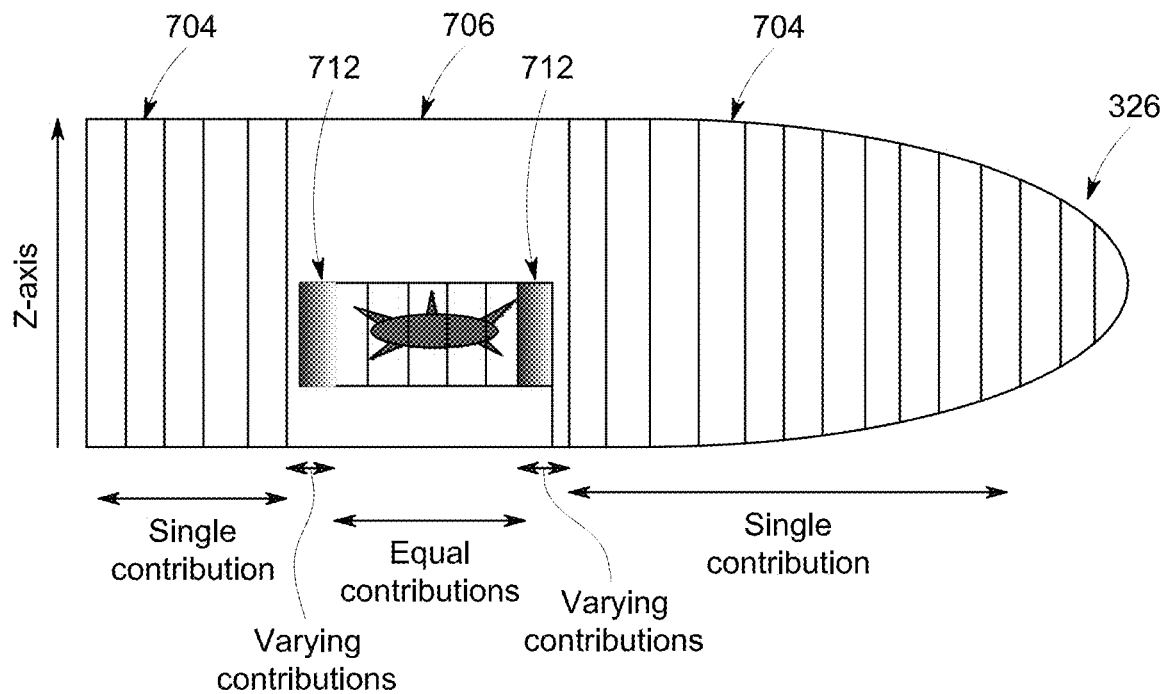
FIG. 12 is a schematic view of the enhanced synthetic 2D image formed by the method of FIG. 11.

In determining the contribution of the projections other than the central projection to the individual pixels in the mass section 706, as best shown in FIG. 12, in one exemplary embodiment when the pixel value in the 2D heat map 328 is below a given threshold, the synthetic 2D low frequency signal utilized for the representation of the pixel in the synthetic 2D image 326 is obtained straight from the central projection 708, as modified according to the method 400. At this pixel location, the contribution of each projection to the synthetic 2D image 326 is not equal, as only the pixel from the modified central projection 708 is represented, i.e., in the background or nonobject section(s) 704.

When the value for the 2D heat map 328 at a pixel (x,y) is higher than a given threshold, such as according to the desired sensitivity/specificity along the receiver operating characteristic (ROC) curve, i.e., the low frequency signal for the representation of each pixel within the mass section(s) 706 of the synthetic 2D image 326 is obtained from the voxel of highest value in the 3D heat map 312 when following the ray path from (x,y) to the central projection source. In other words, at each pixel in the mass section(s) 706, the contribution of each projection image to the synthetic 2D image is equal, or the value of the intensity for the pixels in each projection image that are aligned with the pixels in the mass section(s) 706 are summed/combined to achieve the intensity value for the pixel(s) in the mass section(s) 706. To perform this function, similarly to the method 400 employed for the detection of the objects of interest, after the detection of the location of a lesion or object of interest in the volume, such as by the determination of the 3D heat map 312 and/or the reprojected 2D heat map 328, a height interval is selected around the location of the object of interest. The height interval can be fixed, or can be manually or automatically determined, such as to correspond to the average height or size of the particular object or objects of interest that are sought within the projection images, or to an entire thickness of the object being imaged, such as a breast or hand or wrist or lung. Using the selected height interval, the processing unit/processor 114,1136,1236 and/or the AI 137,1137,1237 reconstructs a number of slices around the location of the object of interest, in order to capture the pixels in each slice that are representative of the object of interest across the entire height and width of the object of interest. With these slices, the processing unit/processor 114,1136,1236 and/or the AI 137,1137,1237 uses the pixels in the slices to provide the high-frequency information within the mass section(s) 706 of the enhanced image/synthetic 2D image 326 to represent the object of interest the 400 process, as illustrated in FIG. 7.

Finally, at the border 712 between the background or nonobject section(s) 704 and the mass section(s) 706, the synthetic 2D low frequency signal is obtained from a varying combination of the pixel values from each of the sections, i.e., the background or nonobject section(s) 704 where the only contribution comes from the pixel values of the (modified) central projection 708, and the mass sections(s) 706 where the intensity values of the aligned pixels in all projections are represented equally. More specifically, the weighting coefficients for altering the combination of the pixel intensity values from the background or nonobject section(s) 704 and the mass section(s) 706 depends on a distance to the border between the background or nonobject section(s) 704 and the mass section(s) 706. In other words, the contribution of the central projection to the synthetic 2D image 326 varies spatially within the border 712 from 1 adjacent the background or nonobject section(s) 704 (where the pixel intensity value comes entirely from the adjacent pixel in the background or nonobject section 704) down to 1/(the total number of projections) for pixels located immediately adjacent the mass section(s) 706, depending on the distance to border information.

Figure 9A:
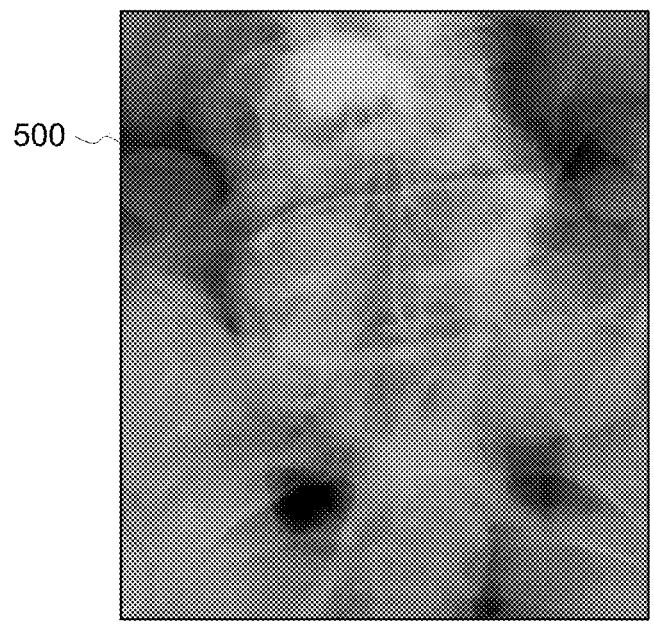
FIGS. 9A-9E are exemplary illustrations of tomographic projections utilized in the method of generation of the synthetic 2D image of FIG. 7.
Figure 9B:
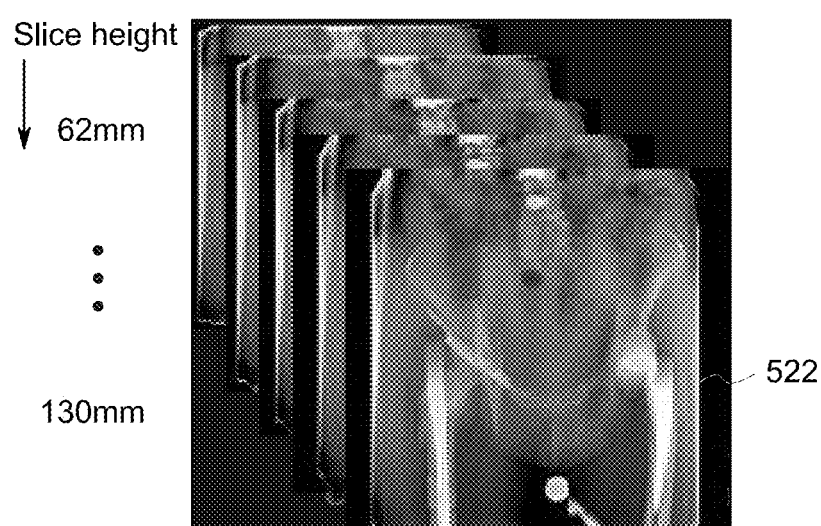
Figure 9C:
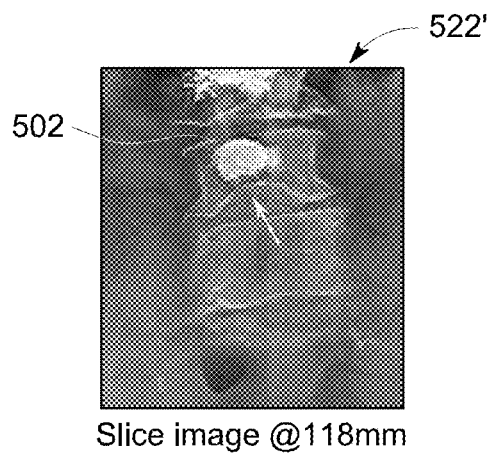
Figure 9D:
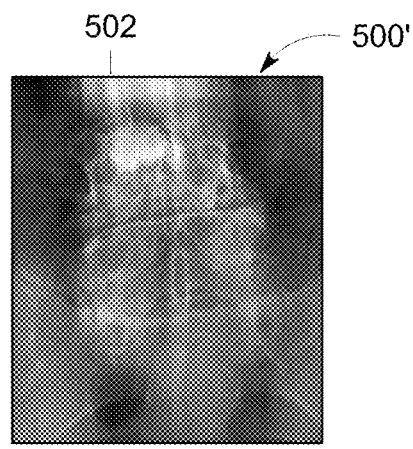
Figure 9E:
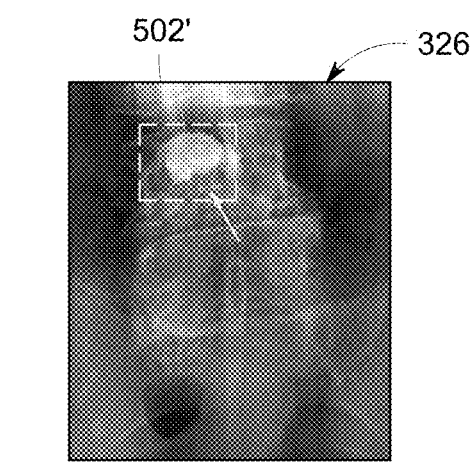

As one example of the combined methods 400 and 700, in FIG. 9A, a central projection 500 of a spine obtained from a tomographic imaging procedure utilizing an imaging system 100,1100,1120 is illustrated including an object of interest 502. In FIG. 9B, a height interval encompassing five (5) slices 522 is determined for use by the processing unit/processor 114,1136,1236 and/or the AI 137,1137,1237 to perform the CAD detection and/or object of interest pixel location analysis of steps 402-406 of the method 400. In FIG. 9C, the object of interest 502 is shown in a single slice 522' contained within the height interval and including the pixels having the highest intensity relating to the detected object 502, thereby defining the slice 522' as a particular slice of interest. In FIG. 9D, an enhanced, or re-projected image 500' of the central projection 500 is produced in combination with the slice 522' according to step 408 of the method 400, and thereby forming the background or non-object section 704 of the enhanced image 500'. In FIG. 9E, the location of the object 502 in the slice 522' which defines the mass section 706 in the (modified) central projection/re-projected image 500' is known, e.g., such as due to the registration of the slice 522' to the 3D volume 307 reconstructed from the projection images 304 used to form the slices 522 and/or due to the intensity values from the 3D heat map 312 and/or reconstructed 2D heat map 328. The mass section 706 of the re-projected image 500' can be enhanced using the method 700 with the information on the pixels representing the object 502 in each of the projection images 304 applied to the mass section 706 of the re-projection image 500' to enhance the representation of the object 502' within the re-projected image 500', thereby creating the enhanced image or the synthetic 2D image 326.

Figure 10A:
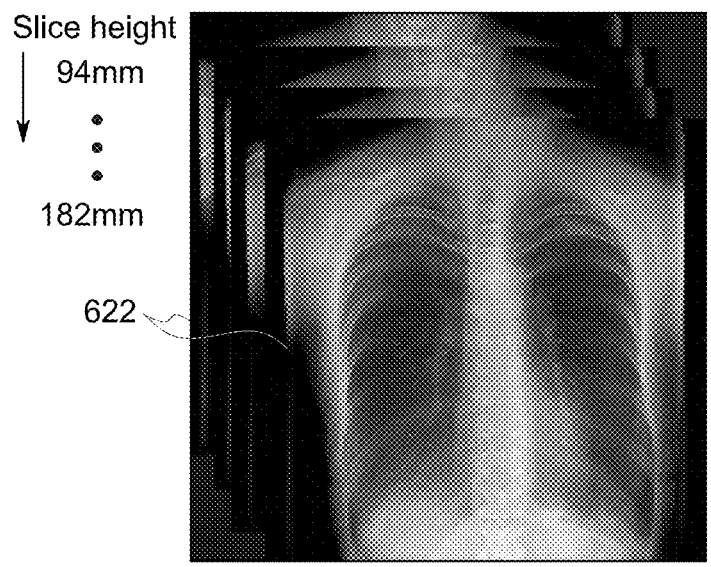
FIGS. 10A-10D are exemplary illustrations of tomographic projections utilized in the method of generation of the synthetic 2D image of FIG. 7.
Figure 10B:
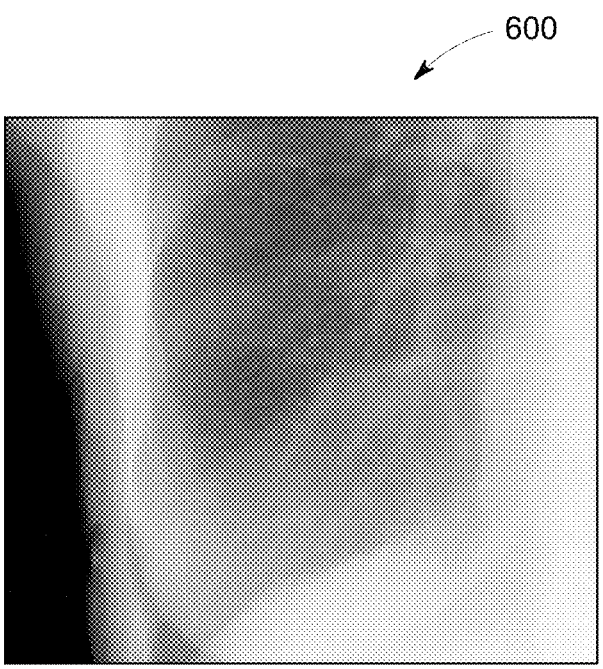
Figure 10C:
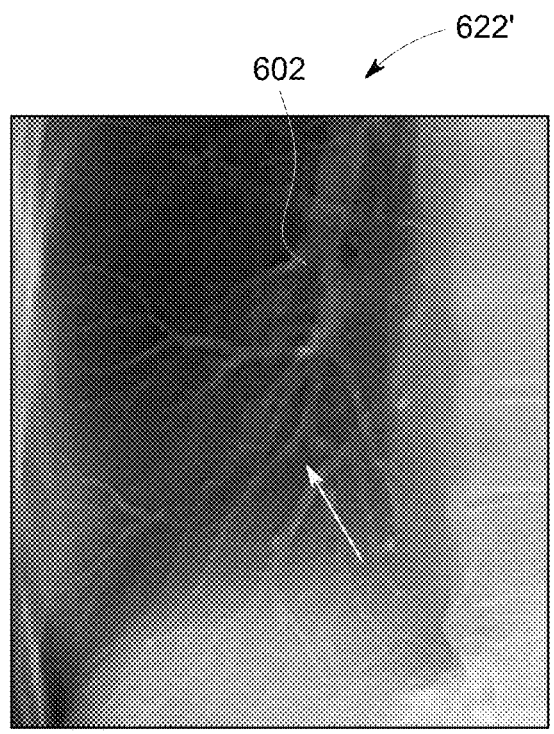
Figure 10D:
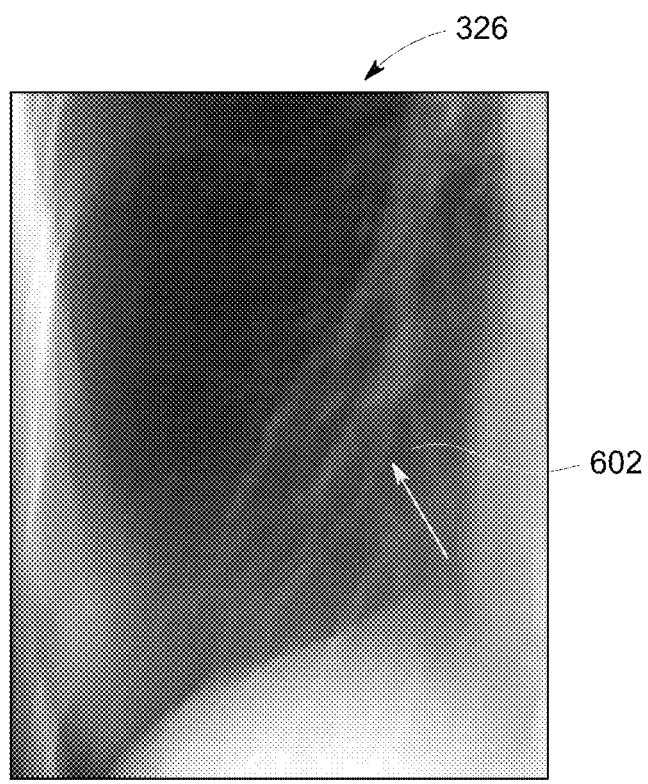

In another exemplary illustration of the operation of method of FIGS. 6, 7 and 11, in FIGS. 10A-10D, in FIG. 10A a height interval encompassing four (4) slices 622 is determined for use by the processing unit/processor 114, 1136,1236 and/or the AI 137,1137,1237 to perform the CAD detection analysis. In FIG. 10B, a central projection 600 of a portion of a spine obtained from a tomography imaging procedure utilizing an imaging system 100,1100,120 is illustrated. In FIG. 10C, the object of interest 602 is shown in a single slice 622' contained within the height interval and including the pixels having the highest intensity relating to the detected object 602, thereby defining the slice 622' as a particular slice of interest. In FIG. 10D, an enhanced, or re-projected image 600' of the central projection 600 is produced in combination with the slice 622' according to step 408 of the method 400, thereby forming the background or nonobject section 704 of the enhanced image 600'. The location of the object 602 in the slice 622' which defines the mass section 706 in the (modified) central projection/re-projected image 600' is known, e.g., such as due to the registration of the slice 622' a 3D volume (not shown) reconstructed from the projection images (not shown) used to form the slices 522 and/or due to the intensity values from the associated 3D heat map 312 and/or reconstructed 2D heat map 328 formed in the method 300. The mass section 706 of the re-projected image 600' can be enhanced using the method 700 with the information on the pixels representing the object 602 in each of the projection images applied to the mass section 706 of the re-projection image 600' to enhance the representation of the object 602' within the re-projected image 600', thereby creating the enhanced image or the synthetic 2D image 326.

It is understood that the aforementioned compositions, apparatuses and methods of this disclosure are not limited to the particular embodiments and methodology, as these may vary. It is also understood that the terminology used herein is for the purpose of describing particular exemplary embodiments only, and is not intended to limit the scope of the present disclosure which will be limited only by the appended claims.

We claim:

1. A method for obtaining at least one enhanced image of an anatomy using a tomosynthesis system comprising an x-ray source facing a detector, the method comprising:
   a. operating the x-ray source to acquiring a number of 2D projection images of the anatomy at a plurality of angular positions;
   b. reconstructing a volume of the anatomy from the 2D projection images;
   c. locating one or more objects of interest within the volume; and
   d. enhancing at least one 2D projection image to form a synthetic 2D image illustrating the one or more objects of interest with varying contributions from each of the 2D projection images for the pixels within the synthetic 2D image, wherein the step of enhancing the at least one 2D projection image comprises the steps of:
   a. segmenting the 2D tomosynthesis projection image to be enhanced into one or more object of interest sections and into a nonobject of interest section;

b. applying a first contribution obtained exclusively from the at least one 2D projection image to be enhanced in a nonobject of interest section of the enhanced image; and c. applying a second contribution from the 2D projection images in the one or more object of interest sections of the enhanced image.

2. The method of claim 1, wherein the step of enhancing the at least one 2D projection image comprises enhancing a central 2D projection image.

3. The method of claim 1, wherein the step of locating the one or more objects of interest further comprises the steps of:
   a. forming a 2D heat map for each 2D projection image from pixel intensity values within the projection image;
   b. forming a 3D heat map including voxel intensity values from the 2D heat maps including the pixel intensity values; and
   c. locating the one or more objects of interest in the 3D heat map based on the voxel intensity values.

4. The method of claim 1, wherein the step of applying the first contribution comprises filtering the at least one 2D projection image within the nonobject section to obtain a nonobject background.

5. The method of claim 4, wherein the step of applying the first contribution comprises:
   a. filtering the 2D projection images;
   b. selecting a height interval covering the entire anatomy;
   c. reconstructing a number of slices across the height interval from the filtered projections;
   d. reprojecting the slices within the height interval; and
   e. combining the reprojected slices with the aligned pixels of the nonobject background to obtain the enhanced image.

6. The method of claim 1, wherein the step of applying the second contribution comprises employing pixel information from all the projections within the object of interest section to obtain an object background.

7. The method of claim 1, wherein the step of applying the second contribution comprises the steps of:
   a. filtering the 2D projection images;
   b. selecting a height interval within the volume containing the one or more objects of interest;
   c. reconstructing a number of slices across the height interval from the filtered projections;
   d. reprojecting the slices within the height interval; and
   e. combining the reprojected slices with the aligned pixels of the object background to obtain the enhanced image.

8. The method of claim 7, wherein the step of selecting the height interval comprises at least one of:
   a. determining a type of lesion forming the one or more objects of interest; and
   b. selecting a height interval based on the average size of the type of lesion.

9. The method of claim 7, wherein the step of selecting the height interval is manually performed.

10. The method of claim 7, wherein the step of selecting the height interval is automatically performed.

11. The method of claim 1, further comprising the step of applying a third contribution from the at least one 2D projection images in a border defined between the nonobject section and the one or more object of interest sections of the enhanced image.

12. A method for obtaining at least one enhanced image of an anatomy using a tomosynthesis system comprising an x-ray source facing a detector, the method comprising:

a. operating the x-ray source to acquiring a number of 2D projection images of the anatomy at a plurality of angular positions;
b. reconstructing a volume of the anatomy from the 2D projection images;
c. locating one or more objects of interest within the volume; and
d. enhancing at least one 2D projection image to form a synthetic 2D image illustrating the one or more objects of interest with varying contributions from each of the 2D projection images for the pixels within the synthetic 2D image, wherein the step of enhancing the at least one 2D projection image comprises the steps of:
a. segmenting the 2D tomosynthesis projection image to be enhanced into one or more object of interest sections and into a nonobject of interest section;
b. applying a first contribution from the 2D projection images in a nonobject of interest section of the enhanced image;
c. applying a second contribution from the 2D projection images in the one or more object of interest sections of the enhanced image; and
d. applying a third contribution from the at least one 2D projection images in a border defined between the nonobject section and the one or more object of interest sections of the enhanced image, wherein the step of applying the third contribution comprises applying a variable combination of the nonobject background with the object background depending on the distance to the object border.

13. An x-ray tomosynthesis imaging system comprising:
a. a gantry including an x-ray detector and an x-ray source alignable with regard to the x-ray detector to obtain 2D tomosynthesis projection images of a subject placed on or adjacent the x-ray detector;
b. an image system operably connected to the gantry to control the x-ray source and x-ray detector to generate 2D tomosynthesis projection image data, the image system including a processing unit for processing the 2D tomosynthesis projection image data from the detector to reconstruct a volume, a database operably connected to the processing unit and storing instructions for operation of the imaging system to produce at least one enhanced image of an object of interest located within the subject, a display operably connected to the image system for presenting information to a user, and a user interface operably connected to the image system to enable user input to the image system; and wherein the image system is configured to acquire a number of 2D projection images of the object of interest at a plurality of angular positions, to reconstruct a volume of the object of interest from the 2D projection images, to locate one or more objects of interest within the volume and to enhance at least one 2D projection image to form an enhanced image illustrating the one or more objects of interest with varying contributions from each of the 2D projection images for the pixels within the enhanced image, wherein the image system is configured to enhance the at least one 2D projection image with a first contribution obtained exclusively from the at least one 2D projection image to be enhanced in a nonobject of interest section of the enhanced image.

14. The x-ray tomosynthesis imaging system of claim 13 the system is configured to segment the 2D tomosynthesis projection image to be enhanced into a background section and one or more object of interest sections, to select a first height interval and a second height interval across the volume, to apply the first contribution from the 2D projection images across the first height interval in a background section of the enhanced image and to apply a second contribution from the 2D projection images across the second height interval in each of the one or more object of interest sections of the enhanced image.

15. The x-ray tomosynthesis imaging system of claim 14, wherein the system is configured to apply the first contribution by filtering the at least one 2D projection image within the nonobject section to obtain a nonobject background.

16. The x-ray tomosynthesis imaging system of claim 14, wherein the system is configured to apply the first contribution by:
   a. filtering the 2D projection images;
   b. selecting a height interval covering the entire anatomy;
   c. reconstructing a number of slices across the height interval from the filtered projections;
   d. reprojecting the slices within the height interval; and
   e. combining the reprojected slices with the aligned pixels of the nonobject background to obtain the enhanced image.

17. The x-ray tomosynthesis imaging system of claim 14, wherein the system is configured to apply the second contribution by employing pixel information from all the projections within the object of interest section to obtain an object background.

18. The x-ray tomosynthesis imaging system of claim 14, wherein the system is configured to apply the second contribution by:
   a. filtering the 2D projection images;
   b. selecting a height interval within the volume containing the one or more objects of interest;
   c. reconstructing a number of slices across the height interval from the filtered projections;
   d. reprojecting the slices within the height interval; and
   e. combining the reprojected slices with the aligned pixels of the object background to obtain the enhanced image.

19. The x-ray tomosynthesis imaging system of claim 13, wherein the system is configured to select the height interval by:
   a. determining a type of lesion forming the one or more objects of interest; and
   b. selecting a height interval based on the average size of the type of lesion.

* * * * *